United States Patent
Onishi

(10) Patent No.: US 6,432,552 B1
(45) Date of Patent: Aug. 13, 2002

(54) SAPONIFIED ETHYLENE-VINYL ACETATE COPOLYMER AND LAMINATE

(75) Inventor: Hideshi Onishi, Kurashiki (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/484,269

(22) Filed: Jan. 18, 2000

(30) Foreign Application Priority Data

Jan. 19, 1999 (JP) .......................................... 11-010323
Mar. 16, 1999 (JP) .......................................... 11-069680

(51) Int. Cl.$^7$ .......................... B32B 27/28; B32B 27/30; C08L 29/04
(52) U.S. Cl. ...................... 428/522; 428/35.4; 428/36.6; 428/36.7; 428/500; 428/520; 524/399; 524/400
(58) Field of Search .................................. 524/399, 400; 428/522, 520, 35.4, 36.6, 36.7, 500

(56) References Cited

U.S. PATENT DOCUMENTS 5,032,632 A * 7/1991 Saxton ........................ 524/139
5,118,743 A 6/1992 Yonezu et al. ............... 524/287
5,360,670 A 11/1994 Yonezu et al. ............... 428/412

* cited by examiner

Primary Examiner—D. S. Nakarani
(74) Attorney, Agent, or Firm—Armstrong Westerman & Hattori, LLP

(57) ABSTRACT

A saponified ethylene-vinyl acetate copolymer is characterized in that, in the relationship between the heating time and the extrusion rate as measured with a Koka flow tester at at least one temperature higher by 10–80° C. than the melting point thereof, it shows an extrusion rate at any time within the period of 15 minutes to 2 hours of heating which is 0.1–50 times the extrusion rate at 15 minutes of heating and an extrusion rate at any time within the period of 2–10 hours of heating which is less than 2 times the extrusion rate at 15 minutes of heating and that, in the relationship between the heating time and the torque at at least one temperature higher by 30–60° C. than the melting point, it shows, at any time within the range of 1–2 hours of heating, a toruque value within the range of $\frac{1}{6}$ to $\frac{5}{6}$ of the maximum torque value found within the initial 20 minutes of heating.

6 Claims, No Drawings

SAPONIFIED ETHYLENE-VINYL ACETATE COPOLYMER AND LAMINATE

FIELD OF THE INVENTION

This invention relates to a saponified ethylene-vinyl acetate copolymer (hereinafter briefly referred to as EVOH) and a laminate comprising a layer which comprises said EVOH. More particularly, it relates to an EVOH species excellent in long-run moldability, nonretainability in extruders and heat stability, among others, and to a laminate which comprises a layer comprising said EVOH species and is excellent in appearance and in heat stability during regrinding.

BACKGROUND OF THE INVENTION

Generally, EVOH copolymers are excellent in transparency, gas barrier and aroma-retaining properties, solvent resistance and oil resistance, among others, and are used, for making the best use of such characteristic features, in the form of moldings such as films, sheets, or bottles or like containers, for packaging foodstuffs, drugs, industrial chemicals, agrochemicals and so forth. However, EVOHs are susceptible to thermal degradation, hence to rapid changes in melt viscosity and, at the same time, may undergo discoloration. Therefore, in the step of molding (melt molding) of such products, special care should be taken. Furthermore, EVOHs are frequently used in laminates together with another or other thermoplastic resins and therefore required to have good appearance characteristics.

Accordingly, various attempts have so far been made, for example sufficient washing of EVOHs with water or incorporation of a certain metal salt. As far as long-run continuous molding is concerned, however, there is still room for improvement.

For achieving such improvement, JP Kokai S64-64843 or U.S. Pat. No. 5,360,670 and JP Kokai S64-66262 or U.S. Pat. No. 5,118,743 propose an EVOH species which exhibits such flow characteristics that, in the relationship between the heating time and the extrusion rate at least one temperature in a range of from 10 to 80° C. higher than the melting point of said EVOH measured with a Koka flow tester, the extrusion rate does not substantially increase for the initial 15 minutes, thereafter the extrusion rate at any heating time after 15 minutes until 2 hours is in a range of from 1/10 to 50 times that after the initial 15 minutes, and the extrusion rate at any heating time after 2 hours until 10 hours is at least once in a range from 2 to 50 times that after the initial 15 minutes.

However, intensive investigations made by the present inventors concerning such flow characteristics of EVOHs revealed that EVOHs with the flow characteristics such that the extrusion rate at any heating time after 2 hours until 10 hours is at least once in a range from 2 to 50 times that after the initial 15 minutes still have a heat stability problem. In particular, in the step of processing at high temperatures or processing during which EVOHs tend to undergo a shearing action, decomposition gases generate in considerable amounts and thus the heat stability decreases. Improvements in this respect are thus required.

In the case of laminates in which an EVOH is used, recycling, regrinding or like processing for reuse results in a decrease in processability, hence it is difficult to obtain good recycled laminates. Improvements in this respect are also required.

The present invention has been accomplished as a result of intensive investigations concerning the flow characteristics of EVOHs and has for its object to provide an EVOH species excellent in long-run moldability, nonretainability in extruders and heat stability as well as an EVOH laminate excellent in appearance and in heat stability in the step of regrinding.

SUMMARY OF THE INVENTION

The saponified ethylene-vinyl acetate copolymer (EVOH) of the present invention is characterized in that, in the relationship between the heating time and the extrusion rate as measured with a Koka flow tester at at least one temperature higher by 10 to 80° C. than the melting point thereof as measured by differential scanning calorimetry (DSC), it shows an extrusion rate at any time within the period of 15 minutes to 2 hours of heating which is 0.1 to 50 times the extrusion rate at 15 minutes of heating and an extrusion rate at any time within the period of 2 to 10 hours of heating which is less than 2 times the extrusion rate at 15 minutes of heating and that, in the relationship between the heating time and the torque as measured with a torque detecting rheometer at at least one temperature higher by 30 to 60° C. than the melting point thereof as measured by DSC, it shows, at any time within the range of 1 to 2 hours of heating, a toruque value within the range of ⅙ to ⅚ of the maximum torque value found within the initial 20 minutes of heating. The laminate of the present invention is characterized in that it comprises at least one layer comprising said EVOH.

DETAILED DESCRIPTION OF THE INVENTION

In the following, the present invention is described in detail.

The melting point as so referred to herein means the value of the main endothermic peak temperature in DSC (differential scanning calorimetry; programmed hating rate: 10° C./min). The extrusion or discharge rate is measured on a Koka flow tester (capillary rheometer) using a nozzle having a diameter of 1 mm and a length of 10 mm under a load of 10 kg/cm$^2$ and the measurement time includes 5 minutes of preheating.

The relationship between time and torque is determined using a torque-detecting rheometer using a mixer and roller blade for measurement with a chamber capacity of 60 cc. The sample (55 g) (90 to 100% by volume filling) is charged, under air, through the feed opening and, after tight sealing under a load of 7 kg applied to the lid, preheated for 5 minutes and then kneaded by increasing the rate of revolutions to 50 rpm within 30 seconds, and the torque value after 60 minutes of kneading is detected and recorded.

As specific examples of such torque-detecting rheometer, there may be mentioned Brabender "Plasti-Corder" and Toyo Seiki Seisakusho "Labo-Plastomil", among others.

Usable as the roller blade are "Roller Mixer W50" for "Plasti-Corder" and "Roller Blade R60B" for "Labo-Plastomil".

As mentioned above, the EVOH according to the present invention has specific flow characteristics such that, in the relationship between the heating time and the extrusion rate as measured with a Koka flow tester at at least one temperature higher by 10 to 80° C. than the melting point thereof as measured by DSC, the extrusion rate at any time within the period of 15 minutes to 2 hours of heating is 0.1 to 50 times the extrusion rate at 15 minutes of heating and the extrusion rate at any time within the period of 2 to 10 hours of heating is less than 2 times the extrusion rate at 15 minutes of heating and that, in the relationship between the heating time and the torque as measured with a torque-detecting rheometer at at least one temperature higher by 30 to 60° C. than the melting point thereof as measured by DSC, the toruque value at any time within the range of 1 to 2 hours of heating is within the range of 1/6 to 5/6 (preferably 1/3 to 2/3) of the maximum torque value found within the initial 20 minutes of heating. Said EVOH is not particularly restricted but may be any one satisfying the above necessary conditions. For obtaining such an EVOH species, it is generally necessary to subject an ordinary EVOH species to a specific treatment.

Said specific treatment will be described later herein. The EVOH species to be treated is not particularly restricted but may be one with an ethylene content of 20 to 60 mole percent (preferably 25 to 55 mole percent) and a saponification degree of not less than 90 mole percent (preferably not less than 95 mole percent). When said ethylene content is less than 20 mole percent, the gas barrier properties under high humidity conditions and the melt moldability will be low. When, conversely, it exceeds 60 mole percent, sufficient gas barrier properties may not be obtained. A saponification degree less than 90 mole percent is unfavorable since it gives only low gas barrier properties, heat stability and moisture resistance.

Said EVOH species preferably has a melt index (MI) (measured at 210° C. under a load of 2,160 g) of 1 to 100 g/10 minutes (preferably 3 to 50 g/10 minutes) When said melt index is lower than said range, the extruder inside reaches a high torque state in the step of molding, which makes extrusion difficult. When it is above said range, moldings will unfavorably be insufficient in mechanical strength.

Such EVOH species is obtained by saponifying an ethylene-vinyl acetate copolymer, which in turn is produced by an arbitrarily selected known method of polymerization, for example by solution polymerization, suspension polymerization or emulsion polymerization. The saponification of the ethylene-vinyl acetate copolymer can be effected also by a per se known method.

In the practice of the present invention, a further ethylenically unsaturated copolymerizable comonomer may be subjected to the above copolymerization in an amount in which the effects of the present invention will not be weakened by said comonomer. Such comonomer includes, among others, olefins such as propylene, 1-butene and isobutene; unsaturated acids such as acrylic acid, methacrylic acid, crotonic acid, phthalic acid (anhydride), maleic acid (anhydride) and itaconic acid (anhydride) or salts or $C_1$–$C_{18}$ mono- or dialkyl esters thereof; acrylamides such as acrylamide, N—$C_1$–$C_{18}$ alkylacrylamides, N,N-dimethylacrylamide, 2-acrylamidopropanesulfonic acid and salts thereof, acrylamidopropyldimethylamine and acid salts thereof, or quaternary salts thereof; methacrylamides such as methacrylamide, N—$C_1$–$C_{18}$ alkylmethacrylamides, N,N-dimethylmethacrylamide, 2-methacrylamidopropanesulfonic acid and salts thereof, methacrylamidopropyldimethylamine or acid salts thereof, or quaternary salts thereof; N-vinylamides such as N-vinylpyrrolidone, N-vinylformamide and N-vinylacetamide; vinyl cyanides such as acrylonitrile and methacrylonitrile; vinyl ethers such as $C_1$–$C_{18}$ alkyl vinyl ethers, hydroxyalkyl vinyl ethers and alkoxyalkyl vinyl ethers; vinyl halides such as vinyl chloride, vinylidene chloride, vinyl fluoride, vinylidene fluoride and vinyl bromide; vinylsilanes such as trimethoxyvinylsilane; allyl acetate, allyl chloride, allyl alcohol, dimethylallyl alcohol, trimethyl(3-acrylamido-3-dimethylpropyl)ammonium chloride, acrylamido-2-methylpropanesulfonic acid and the like.

The method of providing such an EVOH species as mentioned above with the specific flow characteristics defined herein is not particularly restricted but may comprise causing a higher fatty acid salt to adhere to the EVOH surface or treating it by immersing in water containing a large amount of an alkaline earth metal such as calcium or magnesium. For commercial practicing, however, the method comprising causing a higher fatty acid salt to adhere to the surface of EVOH pellets is preferred. In the following, such method will be further described. The description has no limitative meaning, however.

As said higher fatty acid salt, there may be mentioned salts of fatty acids containing not less than 8 carbon atoms, specifically, alkali metal salts, such as sodium salts and potassium salts, alkaline earth metal salts, such as magnesium salts, calcium salts and barium salts and, further, zinc salts, of higher fatty acids such as lauric aicd, tridecylic acid, myristic acid, pentadecylic acid, palmitic acid, heptadecylic acid, stearic acid, nonadecanoic acid, oleic acid, capric acid, behenic acid and linolic acid, among others. Among these, divalent metal salts (magnesium, calcium or zinc salts) of stearic acid, oleic acid and lauric acid are preferred.

The method of causing such higher fatty acid salt to adhere to the EVOH surface is not particularly restricted but it is only required that said higher fatty acid salt be found finally adhering to the EVOH (pellet) surface. Thus, mention may be made of (1) the method comprising blending the EVOH (pellets) with a water content of 1 to 5% by weight with a higher fatty acid salt, (2) the method comprising heating the EVOH (pellets) and blending the same with a higher fatty acid salt in a molten state, (3) the method comprising admixing the EVOH (pellets) with a small amount of a silicone oil and blending the resulting mixture with a higher fatty acid salt, (4) the method comprising causing the EVOH (pellets) to contain a liquid plasticizer and then blending the same with a higher fatty acid salt and (5) the method comprising blending the EVOH (pellets) with a solution of a higher fatty acid salt in a small amount of a solvent, among others. The method (1) is preferred, however.

Said method is described below in further detail. The description, however, has no limitative meaning.

In causing a higher fatty acid salt to adhere to, or coat the EVOH surface, it is preferred that the water content of EVOH be adjusted to 1 to 5% by weight (more preferably 2 to 3% by weight) so as to increase the adhesion of the higher fatty acid salt. When such water content is less than 1% by weight, the higher fatty acid salt tends to drop off, making the adhesion (sticking) ununiform. A water content exceeding 5% by weight is unfavorable since it causes aggregation of the higher fatty acid salt, which in turn causes the adhesion (sticking) ununiform.

For blending, a rocking mixer, ribbon blender, supermixer or like apparatus may be used.

In this way, the higher fatty acid salt is caused to adhere to the EVOH (pellet) surface. The amount of said salt adhering to said surface is preferably 30 to 300 ppm (more preferably 50 to 250 ppm, most preferably 100 to 200 ppm) relative to the EVOH. When said amount is smaller than 30 ppm, the long-run moldability may decrease. An amount exceeding 300 ppm may unfavorably cause significant gas generation due to decomposition.

An EVOH species satisfying the flow characteristics requirements according to the present invention can thus be obtained. In the first place, in the relationship between the heating time and the extrusion rate as measured with a Koka flow tester at at least one temperature higher by 10 to 80° C. than the melting point thereof as measured by DSC, such EVOH species shows an extrusion rate at any time within the period of 15 minutes to 2 hours of heating which is 0.1 to 50 times the extrusion rate at 15 minutes of heating. When the ratio is less than 0.1, an intense viscosity increase will occur, giving defective processing results. Conversely when it is above 50, an intense viscosity decrease will occur, causing molding difficult, hence the objects of the present invention cannot be accomplished. In the same relationship, said EVOH species shows an extrusion rate at any time within the period of 2 to 10 hours of heating which is less than 2 times the extrusion rate at 15 minutes of heating. When this ratio is not less than 2, gas generation due to decomposition will be significant, hence the objects of the present invention will not be accomplished. Further, in the relationship between the heating time and the torque as measured with a torque detecting rheometer at at least one temperature higher by 30 to 60 than the melting point thereof as measured by DSC, it shows, at any time within the range of 1 to 2 hours of heating, a toruque value within the range of $\frac{1}{6}$ to $\frac{5}{6}$ (preferably $\frac{1}{3}$ to $\frac{2}{3}$) of the maximum torque value found within the initial 20 minutes of heating. When such ratio is less than $\frac{1}{6}$, the viscosity will decrease intensely, making molding difficult. When, conversely, it is in excess of $\frac{5}{6}$, the long-run moldability will become poor and, in that case, too, the objects of the present invention will not be accomplished.

Thus, when and only when all the specific flow characteristics mentioned above are satisfied, the objects of the present invention can be accomplished.

Since the EVOH species according to the present invention has such specific flow characteristics as mentioned above, the effects of addition of a lubricant are great and, thus, a marked effect of addition of a lubricant can be expected, for example, in suppressing changes in motor torque in the step of extrusion molding. As such lubricant, there may be mentioned amide lubricants such as ethylenebisstearamide, ethylenebisoleamide, ethylenebiserucamide, ethylenebislauramide, m-xylylenebisstearamide, p-phenylenebisstearamide, erucamide, oleamide, stearamide and behenamide; fatty acid methyl ester lubricants such as methyl laurate, methyl myristate, methyl palmitate, methyl stearate, methyl oleate, methyl erucate and methyl behenate; monoester lubricants such as butyl laurate, butyl stearate, isopropyl myristate, isopropyl palmitate, octyl palmitate, coco fatty acid octyl ester, octyl stearate, lauryl laurate, stearyl stearate, behenyl behenate and cetyl myristate; fatty acid triglyceride lubricants, higher alcohol lubricants, higher fatty acid lubricants, monoglyceride lubricants, ester wax lubricants, polyethylene wax lubricants and the like. The addition level thereof is preferably 50 to 2,000 ppm, more preferably 100 to 1,000 ppm.

The addition of an antioxidant is also preferred. As such antioxidant, there may be mentioned pentaerythritol tetrakis [3-(3,5-di-tert-butyl-4-hydroxyphenyl)propionate], triethylene glycol bis[3-(3-tert-butyl-5-methyl-4-hydroxyphenyl) propionate], 1,6-hexanediol bis[3-(3,5-di-tert-butyl-4-hydroxyphenyl)propionate], 2,4-bis(n-octylthio)-6-(4-hydroxy-3,5-di-tert-butylanilino)-1,3,5-triazine, 2,2'-thiodiethylene bis[3-(3,5-di-tert-butyl-4-hydroxyphenyl) propionate], N,N'-hexamethylene-bis(3,5-di-tert-butyl-4-hydroxyhydrocinnamide), octadecyl 3-(3,5-di-tert-butyl-4-hydroxyphenyl)propionate, diethyl 3,5-di-tert-butyl-4-hydroxybenzylphosphonate, 1,3,5-trimethyl-2,4,6-tris(3,5-di-tert-butyl-4-hydroxybenzyl)benzene, tris(3,5-di-tert-butyl-4-hydroxybenzyl) isocyanurate, octylated diphenylamine, 2,4-bis[(octylthio)methyl]-o-cresol, isooctyl 3-(3,5-di-tert-butyl-4-hydroxyphenyl)propionate, tris(2,4-di-tert-butylphenyl) phosphite and the like. The addition level thereof is preferably 30 to 4,000 ppm, more preferably 50 to 2,000 ppm.

In such EVOH of the present invention, there may further be incorporated, if necessary or where appropriate, one or more additives, such as a plasticizer, antislip agent, antiblocking agent, heat stabilizer, ultraviolet absorber, antistatic agent, surfactant, colorant, antimicrobial agent and/or filler and/or another resin or other resins. In particular, a hydrotalcite compound or a hindered phenol or hindered amine heat stabilizer can be added as an antigelling agent.

Within limits within which the effects of the present invention are impaired, two or more EVOH species differing in structure or molecular weight may be used combinedly and it is also possible to add an acid component (e.g. acetic acid, phosphoric acid, boric acid).

The EVOH species of the present invention is excellent in moldability and can be used in the field of moldings. Thus, it can be molded, by melt molding, for instance, into, for example, pellets, films, sheets, containers, fibers, rods, tubes and other various shaped articles. It is also possible to subject ground materials obtained therefrom (e.g. in the case of recycled use of products collected or recovered) or pellets of said EVOH or from said ground materials again to melt molding. Mainly employed as the method of such melt molding are extrusion (e.g. T-die extrusion, inflation extrusion, blow molding, melt spinning, contour extrusion) and injection molding. The melt molding temperature is selected within the range of 150 to 300° C. in most cases.

While the EVOH of the present invention can be used as a single layer product, the effects of the present invention can satisfactorily produced when it is used in producing laminates. More specifically, it is useful to use said EVOH in multilayer laminates by laying a thermoplastic resin layer or like layer on at least one side of a layer of said EVOH.

The laminate of the present invention comprises at least one layer comprising an EVOH species having such specific flow characteristics as mentioned above (hereinafter referred to as "f-EVOH"). Specifically, the laminate may comprise an intermediate, innermost or outermost layer comprising said f-EVOH. The layer comprising said f-EVOH may be a layer made of the f-EVOH alone or a layer made of a blend of said f-EVOH and another EVOH species. The term "intermediate layer" as used herein means not only the middle (central part) layer of a laminate but also the layer having at least one layer on each side. Further, the term "innermost or outermost layer" as used herein means the exposed layer of a laminate and, when the inside and outside can be distinguished, as in the case of containers or the like, the innermost layer means the inside exposed layer and the outermost layer means the outside exposed layer.

When a layer(s) comprising the f-EVOH is (are) designated as a ($a_1$, $a_2$, . . . ) and the other layer(s) as b ($b_1$, $b_2$, . . . ), said laminate includes, more specifically, not only the two-layer structure a/b but also laminates having the layer construction b/a/b, a/b/a, $a_1/a_2/b$, $a/b_1/b_2$, $b_2/b_1/a/b_1/b_2$, $a_1/b_1/a_2/b_2$ or the like. For food packaging or the like, in particular, the layer constitutions b/a/b and $b_2/b_1/a/b_1/b_2$ are useful and, for packaging liquids the aroma of which is required to be retained or the like substances, the layer constitutions a/b$_1$/b$_2$ and a$_1$/b$_1$/a$_2$/b$_2$ are useful and, further, where antistaining properties are required, for example in the case of wallpapers, the layer constitutions a/b and a$_1$/a$_2$/b are useful.

In the case of filaments, arbitrary combinations are possible, for example the a/b bimetal type, core (a)-sheath (b) type, core (b)-sheath (a) type and eccentric core-sheath types.

As the resin to be used as such other layer (b), there may be used thermoplastic resins, including, specifically, olefin homopolymers and copolymers such as linear low-density polyethylene, low-density polyethylene, medium-density polyethylene, high-density polyethylene, ethylene-vinyl acetate copolymers, ionomers, ethylene-propylene copolymers, ethylene-acrylate ester copolymers, polypropylene, propylene-α-olefin ($C_4$–$C_{20}$ α-olefin) copolymers, polybutene and polypentene, blends thereof and polyolefin resins in a broader sense, including modifications of said olefin homopolymers, copolymers or blends thereof as modified, for example, by grafting of an unsaturated carboxylic acid or an ester thereof; polyesters, polyamides, copolyamides, polyvinyl chloride, polyvinylidene chloride, acrylic resins, polystyrene, vinyl ester resins, polyester elastomers, polyurethane elastomers, chlorinated polyethylene, chlorinated polypropylene, aromatic or aliphatic polyketones, polyalcohols, EVOHs and the like. Among them, polypropylene, polyamides, polyethylene, ethylene-vinyl acetate copolymers, polystyrene, polyethylene terephthalate and polyethylene naphthalate are preferred from the practical viewpoint of ease of film formation by coextrusion and physical characteristics (in particular strength) of films.

It is also possible, if necessary, to use an adhesive resin between the above layers a and b. Such resin includes various species and may be selected according to the resin b and, although it cannot be generally specified, there may be mentioned, among others, carboxyl-containing modified olefin polymers derived from olefin polymers (abovementioned polyolefins in broader sense) by chemical binding of an unsaturated carboxylic acid or an anhydride thereof in the manner of addition or grafting, and specifically as preferred one, one or a mixture of two or more selected from among maleic anhydride graft-modified polyethylene, maleic anhydride graft-modified polypropylene, maleic anhydride graft-modified ethylene-ethyl acrylate copolymers and maleic anhydride graft-modified ethylene-vinyl acetate copolymers. It is also possible to blend such adhesive resin with the f-EVOH or some other EVOH or, further, a resin used in the layer b.

The thickness of each layer of the laminate cannot be specified in a general manner since it may vary according to the layer constitution, species of b, use and other factors. Generally, however, the thickness of layer a is selected within the range of about 1 to 200 μm (preferably 3 to 150 μm), the thickness of layer b within the range of about 5 to 100 μm (preferably 10 to 500 μm) and the thickness of the adhesive resin layer within the range of about 1 to 200 μm (preferably 3 to 150 μm)

In producing the laminate, the layer of the f-EVOH or a blend thereof is provided, on one side or each side thereof, with a layer of another base material. The method of lamination includes, among others, the method comprising melt-extruding a thermoplastic resin onto a film or sheet of said f-EVOH or a blend thereof, the method comprising melt-extruding said f-EVOH or a blend thereof onto a substrate made of a thermoplastic resin, the method comprising coextruding said f-EVOH or a blend thereof with a thermoplastic resin, and the method comprising drylaminating a film or sheet of said f-EVOH or a blend thereof with a film or sheet of a thermoplastic resin using a per se known adhesive such as an organotitanium compound, isocyanate compound, polyester compound or polyurethane compound.

Furthermore, when a film or sheet or the like is once molded from the f-EVOH or a blend thereof and then extrusion-coated with another base material or laminated with a film or sheet or the like made of another base material using an adhesive, it is possible to use, in addition to the thermoplastic resins mentioned above, another arbitrarily selected base material (e.g. paper, metal foil, uniaxially or biaxially oriented plastic film or sheet, woven fabric, nonwoven fabric, metal wool, woody material).

The laminate of the present invention may be stretched. Such stretching or drawing is generally carried out under heating. The stretching under heating includes, within the meaning thereof, procedures for molding laminates in the form of films, sheets or parisons uniformly heated into cups, trays, tubes, bottles, films or the like by application of chucks, plugs, vacuum, air pressure, blow or the like, and such stretching may be uniaxial or biaxial. It is favorable from the physical properties viewpoint to carry out the stretching at a draw ratio as high as possible. By this, stretched moldings having good gas barrier properties can be obtained without causing pinhole or crack formation, uneven stretching or ununiform section, or delamination in the step of stretching.

Employable as the method of stretching are those capable of attaining a high draw ratio as selected from among roll stretching, tentering, tubular stretching, stretch blow and vacuum pressure molding techniques. In the case of biaxial stretching, either of the simultaneous and successive biaxial stretching techniques may be employed. The stretching temperature may be selected within the range of 60 to 70° C., preferably 80 to 160° C.

It is also preferred that thermal fixation be effected after completion of the stretching. The thermal fixation can be carried out by per se known means and the film stretched in the above manner is subjected to about 2 to 600 seconds of heat treatment at 80 to 170° C., preferably 100 to 160° C., while maintaining said film in a taut condition.

For use in heat-shrinking packaging of raw meat, processed meat, cheese or the like, the product films after stretching are used as they are without thermal fixation and, after packaging of said raw meat, processed meat, cheese or the like therein, the films are subjected to heat treatment at 50 to 130° C., preferably 70 to 120° C., for about 2 to 300 seconds, whereby said films are heat-shrinked and tight packaging is attained.

The laminate of the present invention may have any form or shape, as mentioned hereinabove, including films, sheets, tapes, bottles, pipes, filaments, profile shapes and the like. If necessary or where appropriate, said laminate may be subjected to heat treatment, cooling treatment, rolling treatment, printing, dry lamination treatment, coating treatment with a solution or melt, bag-making processing, deep drawing, box making, tube making, splitting or like treatment or processing. Said laminate, before or after such treatment or processing is useful as a packaging material for foodstuffs, drugs, industrial chemicals, agrochemicals and various other materials.

The EVOH species of the present invention shows specific flow characteristics and, as a result, is excellent in long-run moldability, nonretainability in extruders and heat stability, among others, and is useful also as a laminate. The EVOH species and the laminate of the present invention are very useful in such fields of application as films, sheets, tubes, bags, containers and the like for packaging foodstuffs, drugs, agrochemicals, industrial chemicals and so forth.

Further, the laminate of the present invention has at least one layer comprising the EVOH species showing specific flow characteristics and therefore is excellent in appearance and heat stability (during regrinding), among others, and such laminate is very useful in such fields of application as films, sheets, tubes, bags, containers and the like for packaging foodstuffs, drugs, agrochemicals and industrial chemicals, among others.

EXAMPLES

The following examples illustrate the invention is further detail.

In the examples, "part(s)" and "%" are on the weight basis, unless otherwise indicated.

Example 1

Water (2 parts) was added to 100 parts of EVOH [ethylene content 35 mole percent; saponification degree 99.6 mole percent; MI 10 g/10 min (210° C.; load: 2,160 g)] in the form of pellets with a water content of 0.1% and blending was conducted in a rocking mixer for 10 minutes to give EVOH pellets with a water content of 2%.

The EVOH pellets thus obtained, 100 parts, were then separately placed in a rocking mixer, 100 ppm of magnesium stearate was further added, followed by blending, to give EVOH pellets with 94 ppm of magnesium stearate adhering to the EVOH pellet surface. The amount of adhering magnesium stearate was calculated from the amount of Mg as determined by atomic absorption spectrometry.

Further, the pellets were dried in a drier maintained at 100° C. for 10 hours to thereby adjust the water content to 0.3%.

The melting point of the EVOH pellets obtained was determined by DSC using a differential calorimetry apparatus (Perkin-Elmer model Pyris 1 DSC; programmed rate of temperature rise: 10° C./min) and found to be 181° C. Further, the extrusion rates after 15 minutes, 1 hour, 2 hours and 4 hours (each including a 5-minute period of preheating) were measured on a Koka flow tester (Shimadzu model CFT-500C flow tester) using a nozzle having a size of 1 mm$\phi$×100 mm L at 261° C. (melting point +80° C.) under a load of 10 kg/cm$^2$ each as a mean of measured values at two piston positions (3 mm and 7 mm) (the measurement results are summarized in Table 1), and the maximum torque value within 20 minutes of heating at 231° C. (melting point +50° C.) and the torque values after 1 hour and 2 hours were measured in air on a torque-detecting rheometer (Brabender "Plasti-Corder PLE 331") using a roller mixer W50E and a quick loading chute by charging 55 g of EVOH pellets through the quick loading chute, preheating under a load of 7 kg for 5 minutes and then raising the number of revolutions to 50 rpm within 15 seconds, followed by 60 minutes of kneading (the measurement results are summarized in Table 2). The values obtained satisfied the flow characteristic requirements according to the present invention.

The EVOH obtained was evaluated for long-run moldability, nonretainability and heat stability in the following manner.

(Long-run Moldability)

The EVOH obtained was fed to a single screw extruder equipped with a T die and film formation was performed under the conditions shown below for 6 hours and the films obtained were evaluated for appearance by observation by the eye.

○ - - - No striation even after the lapse of 6 hours.

Δ - - - Striation occurred within the period of 3 to 6 hours.

× - - - Striation occurred within 3 hours.

[Film Formation Conditions on the Single Screw Extruder]

| | |
|---|---|
| Screw inside diameter | 40 mm |
| L/D | 30 |
| Screw | Full-flighted type |
| Screw compression ratio | 3.0 |
| Screw revolutions | 20 rpm |
| T die | Coat hanger type |
| Die width | 450 mm |
| Lip clearance | 0.25 mm |
| Extrusion temperature | C1: 180° C.  H: 240° C. |
| | C2: 230° C.  D: 240° C. |
| | C3: 240° C. |
| | C4: 240° C. |
| Discharge | about 0.4 kg/hr |

(Nonretainability)

After 6 hours of film forming in the above film-forming process, the T die was dismantled and examined by the eye for the adhesion of residues on the lip portion. The evaluation criteria were as follows:

○ - - - No residue was observed.

Δ - - - A residue was observed on a part of the lip.

× - - - A residue was observed on the whole lip.

(Heat Stability)

The percent weight loss upon heating of the EVOH obtained was measured by means of a TGA (thermal gravimetric analysis) apparatus (Rigaku Denki model "ITG-DTA TG 8120"; the temperature was raised to 210° C. at a programmed rate of 200° C./min, the temperature was maintained at 210° C. for 1 minute and then fixed at 250° C. and, after the lapse of 60 minutes, the percent weight loss was determined) and evaluated according to the following criteria:

○ - - - Less than 5% weight loss.

× - - - Not less than 5% weight loss.

Example 2

EVOH pellets (melting point: 181° C.) with 75 ppm of magnesium stearate adhering thereto were obtained in the manner as in Example 1 except that 80 parts of magnesium stearate was charged. After adjustment of the water content to 0.3%, 150 ppm of erucamide as a lubricant and 100 ppm of pentaerythritol tetrakis[3-(3,5-di-tert-butyl-4-hydroxyphenyl)]propionate as an antioxidant were further added.

Extrusion rate measurements (the results are summarized in Table 1) and torque value measurements (the results are summarized in Table 2) were made in the same manner as in Example 1. The measured values satisfied the flow characteristics requirements according to the present invention.

The pellets obtained were further evaluated in the same manner as in Example 1.

Example 3

EVOH pellets (melting point: 181° C.) with 36 ppm of magnesium oleate adhering thereto were obtained in the manner as in Example 1 except that 40 parts of magnesium oleate was charged in lieu of magnesium stearate. After adjustment of the water content to 0.3%, 150 ppm of erucamide and 100 ppm of ethylenebisstearamide were further added as lubricants.

Extrusion rate measurements (the results are summarized in Table 1) and torque value measurements (the results are summarized in Table 2) were made in the same manner as in Example 1. The measured values satisfied the flow characteristics requirements according to the present invention.

The pellets obtained were further evaluated in the same manner as in Example 1.

Example 4

EVOH pellets (melting point: 181° C.) with 310 ppm of zinc laurate adhering thereto were obtained in the manner as in Example 1 except that 350 parts of zinc laurate was charged in lieu of magnesium stearate. After adjustment of the water content to 0.3%, 150 ppm of ethylenebisstearamide was further added as a lubricant.

Extrusion rate measurements (the results are summarized in Table 1) and torque value measurements (the results are summarized in Table 2) were made in the same manner as in Example 1. The measured values satisfied the flow characteristics requirements according to the present invention.

The pellets obtained were further evaluated in the same manner as in Example 1.

Example 5

EVOH pellets (melting point: 181° C.) with 208 ppm of calcium stearate adhering thereto were obtained in the manner as in Example 1 except that 220 parts of calcium stearate was charged in lieu of magnesium stearate. After adjustment of the water content to 0.3%, 100 ppm of ethylenebisstearamide as a lubricant and 500 ppm of N,N'-hexamethylenebis(3,5-di-tert-butyl-4-hydroxyhydrocinnamide) as an antioxidant were further added.

Extrusion rate measurements (the results are summarized in Table 1) and torque value measurements (the results are summarized in Table 2) were made in the same manner as in Example 1. The measured values satisfied the flow characteristics requirements according to the present invention.

The pellets obtained were further evaluated in the same manner as in Example 1.

Example 6

EVOH pellets (melting point: 162° C.) with 91 ppm of magnesium stearate adhering thereto were obtained in the manner as in Example 1 except that an EVOH species having an ethylene content of 45 mole percent, a saponification degree of 99.6 mole percent and an MI of 10 g/10 minutes (210° C.; load: 2,160 g) was used as the EVOH with a water content of 0.1%. After adjustment of the water content to 0.3%, 100 ppm of ethylene-bisstearamide as a lubricant and 50 ppm of amorphous silica as an antiblocking agent were further added.

Extrusion rate measurements (the results are summarized in Table 1; the measurement temperature was 242° C.) and torque value measurements (the results are summarized in Table 2; the measurement temperature was 212° C.) were made in the same manner as in Example 1. The measured values satisfied the flow characteristics requirements according to the present invention.

The pellets obtained were further evaluated in the same manner as in Example 1.

Example 7

EVOH pellets (melting point: 172° C.) with 89 ppm of magnesium stearate adhering thereto were obtained in the manner as in Example 1 except that an EVOH species having an ethylene content of 35 mole percent, a saponification degree of 98.6 mole percent and an MI of 10 g/10 minutes (210° C.; load: 2,160 g) was used as the EVOH with a water content of 0.1%. After adjustment of the water content to 0.3%, 100 ppm of ethylene-bisstearamide as a lubricant and 50 ppm of amorphous silica as an antiblocking agent were further added.

Extrusion rate measurements (the results are summarized in Table 1; the measurement temperature was 252° C.) and torque value measurements (the results are summarized in Table 2; the measurement temperature was 222° C.) were made in the same manner as in Example 1. The measured values satisfied the flow characteristics requirements according to the present invention.

The pellets obtained were further evaluated in the same manner as in Example 1.

Example 8

EVOH pellets (melting point: 181° C.) with 92 ppm of magnesium stearate adhering thereto were obtained in the manner as in Example 1 except that EVOH pellets with a water content of 5% were prepared from the EVOH pellets with a water content of 0.1%. After adjustment of the water content to 0.3%, 100 ppm of ethylenebisstearamide as a lubricant and 50 ppm of amorphous silica as an antiblocking agent were further added.

Extrusion rate measurements (the results are summarized in Table 1; the measurement temperature was 261° C.) and torque value measurements (the results are summarized in Table 2; the measurement temperature was 231° C.) were made in the same manner as in Example 1. The measured values satisfied the flow characteristics requirements according to the present invention.

The pellets obtained were further evaluated in the same manner as in Example 1.

Example 9

EVOH pellets (melting point: 181° C.) with 98 ppm of magnesium stearate adhering thereto were obtained in the same manner as in Example 1 except that the EVOH pellets with a water content of 0.1% were heated to 150° C. and sprayed with molten magnesium stearate for causing this to adhere to the pellets. After adjustment of the water content to 0.3%, 100 ppm of ethylenebisstearamide was further added as a lubricant.

Extrusion rate measurements (the results are summarized in Table 1; the measurement temperature was 261° C.) and torque value measurements (the results are summarized in Table 2; the measurement temperature was 231° C.) were made in the same manner as in Example 1. The measured values satisfied the flow characteristics requirements according to the present invention.

The pellets obtained were further evaluated in the same manner as in Example 1.

Comparative Example 1

The same EVOH pellets with a water content of 0.1% (melting point: 181° C.) as used in Example 1 were subjected to extrusion rate measurements (the results are summarized in Table 1; the measurement temperature was 261° C.) and torque value measurements (the results are summarized in Table 2; the measurement temperature was 231° C.) as in Example. The measured values, however, failed to satisfy the flow characteristics requirements according to the present invention.

Such pellets were further evaluated in the same manner as in Example 1.

Comparative Example 2

An EVOH composition (melting point: 18° C.) containing 105 ppm of magnesium stearate was prepared by charging 100 parts of the same EVOH pellets with a water content of 0.1% as used in Example 1 and 0.012 part of magnesium stearate into a single screw extruder and melt kneading the mixture at 240° C. Thereto was further added 100 ppm of ethylenebisstearamide as a lubricant.

Extrusion rate measurements (the results are summarized in Table 1; the measurement temperature was 261° C.) and torque value measurements (the results are summarized in Table 2; the measurement temperature was 231° C.) were made in the same manner as in Example 1. The measured values, however, failed to satisfy the flow characteristics requirements according to the present invention.

The pellets obtained were further evaluated in the same manner as in Example 1.

The evaluation results of the examples and comparative examples are summarized in Table 3.

TABLE 2

| Measurement | Torque value (Nm) | | |
|---|---|---|---|
| temperature (° C.) | Maximum value | After 1 hr. | After 2 hrs. |
| Example 1 | 231 | 5.5 [11 min] | 2.6 (0.5) | 2.2 (0.4) |
| Example 2 | 231 | 5.4 [12 min] | 3.8 (0.7) | 3.7 (0.7) |
| Example 3 | 231 | 5.7 [12 min] | 2.8 (0.5) | 2.5 (0.4) |
| Example 4 | 231 | 5.3 [10 min] | 2.4 (0.9) | 2.1 (0.4) |
| Example 5 | 231 | 5.5 [12 min] | 2.8 (0.5) | 2.5 (0.5) |
| Example 6 | 212 | 5.4 [12 min] | 3.8 (0.7) | 3.7 (0.7) |
| Example 7 | 222 | 5.4 [12 min] | 3.8 (0.7) | 3.7 (0.7) |
| Example 8 | 231 | 5.4 [12 min] | 3.8 (0.7) | 3.7 (0.7) |
| Example 9 | 231 | 5.4 [12 min] | 3.8 (0.7) | 3.7 (0.7) |
| Compar. Example 1 | 231 | 7.0 [18 min] | 6.6 (0.9) | 6.6 (0.9) |
| Compar. Example 2 | 231 | 2.2 [17 min] | 0 (0) | 0 (0) |

Note: Each value in [ ] denotes the time at which the torque value arrived at a maximum and each value in ( ) denotes the ratio to the measured value after 15 minutes.

TABLE 3

| | Long-run moldability | Nonretainability | Heat stability* |
|---|---|---|---|
| Example 1 | ○ | ○ | ○ (2.7%) |
| Example 2 | ○ | ○ | ○ (1.6%) |
| Example 3 | ○ | Δ | ○ (3.4%) |
| Example 4 | ○ | ○ | ○ (4.1%) |
| Example 5 | Δ | Δ | ○ (4.4%) |
| Example 6 | ○ | ○ | ○ (1.7%) |
| Example 7 | ○ | ○ | ○ (3.3%) |
| Example 8 | ○ | ○ | ○ (3.3%) |
| Example 9 | ○ | ○ | ○ (3.1%) |
| Compar. Example 1 | x | x | ○ (1.7%) |
| Compar. Example 2 | ○ | ○ | x (13.2%) |

*Each value in the parentheses denotes the measured percent weight loss value.

Example 10

Using a three-species five-layer coextrusion T die film forming apparatus and the EVOH obtained in Example 1, a thermoplastic resin (polypropylene having an MI of 2.4 g/10 minutes as determined at 230° C. under a load of 2,160 g) and an adhesive resin (Mitsubishi Chemical's "Modic AP

TABLE 1

| | Measurement | Extrusion rate (cm³/sec) | | | |
|---|---|---|---|---|---|
| | temperature (° C.) | After 15 min. | After 1 hr. | After 2 hrs. | After 4 hrs. |
| Example 1 | 261 | 1.4 × 10⁻² | 3.7 × 10⁻² (2.6) | 2.6 × 10⁻² (1.9) | 1.7 × 10⁻² (1.9) |
| Example 2 | 261 | 1.3 × 10⁻² | 3.5 × 10⁻² (2.7) | 2.4 × 10⁻² (1.8) | 1.4 × 10⁻² (1.1) |
| Example 3 | 261 | 1.5 × 10⁻² | 4.1 × 10⁻² (2.7) | 2.4 × 10⁻² (1.6) | 1.7 × 10⁻² (1.1) |
| Example 4 | 261 | 1.4 × 10⁻² | 3.6 × 10⁻² (2.6) | 2.4 × 10⁻² (1.7) | 1.7 × 10⁻² (1.2) |
| Example 5 | 261 | 1.6 × 10⁻² | 4.2 × 10⁻² (2.6) | 3.0 × 10⁻² (1.9) | 1.5 × 10⁻² (0.9) |
| Example 6 | 242 | 1.3 × 10⁻² | 3.5 × 10⁻² (2.7) | 2.4 × 10⁻² (1.8) | 1.4 × 10⁻² (1.1) |
| Example 7 | 252 | 1.5 × 10⁻² | 4.1 × 10⁻² (2.7) | 2.4 × 10⁻² (1.6) | 1.7 × 10⁻² (1.1) |
| Example 8 | 261 | 1.3 × 10⁻² | 3.5 × 10⁻² (2.7) | 2.4 × 10⁻² (1.8) | 1.4 × 10⁻² (1.1) |
| Example 9 | 261 | 1.5 × 10⁻² | 4.1 × 10⁻² (2.7) | 2.4 × 10⁻² (1.6) | 1.7 × 10⁻² (1.1) |
| Compar. Example 1 | 261 | 1.0 × 10⁻² | 9.7 × 10⁻² (1.0) | 2.7 × 10⁻² (0.5) | 2.3 × 10⁻² (0.5) |
| Compar. Example 2 | 261 | 1.5 × 10⁻² | 4.1 × 10⁻² (2.7) | 2.4 × 10⁻² (1.6) | 1.7 × 10⁻² (1.1) |

Note: Each numerical value in the parentheses denotes the ratio to the measured value after 15 minutes.

P523" having an MI of 2.5 g/10 minutes as determined at 230° C. under a load of 2,160 g), a laminate having the constitution thermoplastic resin layer (20-μm-thick)/adhesive resin layer (5-μm-thick)/resin composition layer (5-μm-thick)/adhesive resin layer (5-μm-thick)/thermoplastic resin layer (25-μm-thick) was obtained.

The film forming conditions were as follows: [EVOH Film Forming Conditions on the Single Screw Extruder]

| Screw inside diameter | 32 mm | |
|---|---|---|
| L/D | 28 | |
| Extrusion temperature | C1: 180° C. | H: 240° C. |
| | C2: 230° C. | |
| | C3: 240° C. | |
| | C4: 240° C. | |

[Thermoplastic Resin Film Forming Conditions on the Single Screw Extruder]

| Screw inside diameter | 40 mm | |
|---|---|---|
| L/D | 28 | |
| Extrusion temperature | C1: 180° C. | H: 240° C. |
| | C2: 220° C. | |
| | C3: 240° C. | |
| | C4: 240° C. | |

[Adhesive Resin Film Forming Conditions on the Single Screw Extruder]

| Screw inside diameter | 32 mm | |
|---|---|---|
| L/D | 24 | |
| Extrusion temperature | C1: 180° C. | H: 240° C. |
| | C2: 220° C. | |
| | C3: 240° C. | |

[Die Setting Conditions]

| T-die | Feed block 5-layer die |
|---|---|
| Die width | 450 mm |
| Preset temperature | 240° C. |

The laminate obtained was evaluated for appearance and for heat stability in the case of regrining as follows.

(Appearance)

The film obtained was observed by the eye and the appearance thereof was evaluated as follows:

○ - - - No striation even after the lapse of 6 hours.

Δ - - - Striation occurred within the period of 3 to 6 hours.

× - - - Striation occurred within 3 hours.

(Heat Stability in the Case of Regrinding)

The film obtained was ground in a grinder and again fed to a twin-screw extruder and pelletized under the conditions specified below to give repelletized pellets.

[Pelletizing Conditions on the Twin-screw Extruder]

| Screw inside diameter | 30 mm | |
|---|---|---|
| L/D | 30 | |
| Screw revolutions | 120 rpm | |
| Extrusion temperature | C1: 180° C. | H: 220° C. |
| | C2: 210° C. | D: 220° C. |
| | C3: 220° C. | |
| | C4: 220° C. | |
| | C5: 220° C. | |

Forty parts of the repelletization product thus obtained was blended with 60 parts of a thermoplastic resin (polypropylene having an MI of 2.4 g/10 minutes as determined at 230° C. under a load of 2,160 g) to give pellets for forming a reground pellet-derived layer.

Further, using a four-species five-layer T die sheet forming apparatus and an EVOH, a thermoplastic resin (polypropylene having an MI of 2.4 g/10 minutes as determined at 230° C. under a load of 2,160 g), an adhesive resin (Mitsubishi Chemical's "Modic AP P523" having an MI of 2.5 g/10 minutes as determined at 230° C. under a load of 2,160 g) and the above-mentioned pellets for forming a reground pellet-derived layer, a laminate having the constitution thermoplastic resin layer (460 gm)/adhesive resin layer (30 μm)/resin composition layer (100 μm)/adhesive resin layer (30 μm)/reground pellet-derived layer (690 μm)/thermoplastic resin layer (230 μm) was obtained.

The laminate obtained was cut with a razor, an ethanolic solution of iodine and potassium iodide (dilute tincture of iodine, product of All Japan Drug Co.) was applied to the cross section, and the sheet section was observed under an optical microscope and evaluated in the following manner. The number of samples was 10 and the evaluation was made synthetically.

○ - - - EVOH was uniformly dispersed in the reground pellet-derived layer.

× - - - EVOH was found aggregated in the reground pellet-derived layer.

Examples 11 to 18

Laminates composed of five layers were obtained by conducting coextrusion in the same manner as in Example 10 except that the EVOH species obtained in Examples 2 to 9 were respectively used.

Comparative Examples 3 and 4

Laminates composed of five layers were obtained by conducting coextrusion in the same manner as in Example 10 except that the EVOH species used or obtained in Comparative Examples 1 and 2 were used.

Example 19

Using a three-species three-layer coextrusion T die film forming apparatus and the EVOH species obtained in Example 10, a laminate having the layer constitution resin composition (15 μm)/adhesive resin layer (10 gm)/thermoplastic resin (40 μm) was obtained and evaluated in the same manner as mentioned hereinabove.

The preset extruder conditions were as the same as in Example 10 and the T-die setting conditions were as follows.

[Die Setting Conditions]

| T-die | Multimanifold three-layer die |
|---|---|
| Die width | 450 mm |
| Preset temperature | 240° C. |

(Results)

The results obtained in Examples 10 to 19 and Comparative Examples 3 and 4 are summarized in Table 4.

TABLE 4

|  | Appearance | Heat stability |
|---|---|---|
| Example 1 | ○ | ○ |
| Example 2 | ○ | ○ |
| Example 3 | ○ | ○ |
| Example 4 | ○ | ○ |
| Example 5 | ○ | ○ |
| Example 6 | ○ | ○ |
| Example 7 | ○ | ○ |
| Example 8 | ○ | ○ |
| Example 9 | ○ | ○ |
| Example 10 | ○ | ○ |
| Compar. Example 1 | x | ○ |
| Compar. Example 2 | ○ | x |

What is claimed is:

1. A saponified ethylene-vinyl acetate copolymer pellet characterized in that, in the relationship between the heating time and the extrusion rate as measured with a Koka flow tester at least one temperature higher by 10 to 80° C. than the melting point thereof as measured by differential scanning calorimetry (DSC), it shows an extrusion rate at any time within the period of 15 minutes to 2 hours of heating which is 0.1 to 50 times the extrusion rate at 15 minutes of heating, and an extrusion rate at any time within the period of 2 to 10 hours of heating which is less than 2 times the extrusion rate at 15 minutes of heating, and that, in the relationship between the heating time and the torque as measured with a torque detecting rheometer at least one temperature higher by 30 to 60° C. than the melting point thereof as measured by DSC, it shows, at any time within the range of 1 to 2 hours of heating, a torque value within the range of $1/6$ to $5/6$ of the maximum torque value found within the initial 20 minutes of heating;

wherein said saponified ethylene-vinyl acetate copolymer pellet carries a higher fatty acid alkaline earth salt having 12 to 18 carbon atoms adhering to the surface of said EVOH pellet in an amount of 30 to 300 ppm based on the EVOH pellet.

2. A saponified ethylene-vinyl acetate copolymer pellet as claimed in claim 1, wherein, in the relationship between the heating time and the torque as measured with a torque-detecting rheometer at least one temperature higher by 30 to 60° C. than the melting point thereof as measured by DSC, the torque value at any time within the range of 1 to 2 hours of heating is within the range of $1/3$ to $2/3$ of the maximum torque value found within the initial 20 minutes of heating.

3. A saponified ethylene-vinyl acetate copolymer pellet as claimed in claim 1 or claim 2, wherein said higher fatty acid salt comprises at least one of calcium, magnesium and zinc salts.

4. A laminate which comprises at least one layer made from a saponified ethylene-vinyl acetate copolymer pellet showing, in the relationship between the heating time and the extrusion rate as measured with a Koka flow tester at least one temperature higher by 10 to 80° C. than the melting point thereof as measured by differential scanning calorimetry (DSC), an extrusion rate at any time within the period of 15 minutes to 2 hours of heating which is 0.1 to 50 times the extrusion rate at 15 minutes of heating and an extrusion rate at any time within the period of 2 to 10 hours of heating which is less than 2 times the extrusion rate at 15 minutes of heating and, in the relationship between the heating time and the torque as measured with a torque detecting rheometer at a least one temperature higher by 30 to 60° C. than the melting point thereof as measured by DSC and at any time within the range of 1 to 2 hours of heating, a torque value within the range of $1/6$ to $5/6$ of the maximum torque value found within the initial 20 minutes of heating;

wherein said saponified ethylene-vinyl acetate copolymer pellet carries a higher fatty acid alkaline earth salt having 12 to 18 carbon atoms adhering to the surface of said EVOH pellet in an amount of 30 to 300 ppm based on the EVOH pellet.

5. A laminate as claimed in claim 4, wherein the saponified ethylene-vinyl acetate copolymer-containing layer constitutes an intermediate layer.

6. A laminate as claimed in claim 4, wherein the saponified ethylene-vinyl acetate copolymer-containing layer constitutes an innermost or outermost layer.

* * * * *